United States Patent Office.

S. FRANKLIN SCHOONMAKER, OF NEW YORK, N. Y.

Letters Patent No. 75,203, dated March 3, 1868; antedated February 22, 1868.

IMPROVED MODE OF PRESERVING HOPS.

The Schedule referred to in these Letters Patent and making part of the same.

TO ALL WHOM IT MAY CONCERN:

Be it known that I, S. FRANKLIN SCHOONMAKER, of the city, county, and State of New York, have invented a new and useful Method for Preserving Hops, or technically, the catkins or strobiles of the "*Humulus lupulus;*" and I do hereby declare that the description hereinafter contained is a true and exact account and explanation of the process I employ, and how the same may be put in practice.

It is well known among producers and merchants in hops that after the gathering of the crop, the hops immediately commence to undergo a process of deterioration, so that at the end of one year they have lost about one-third of their value, and in from three to five years after gathering have become comparatively worthless.

By chemical investigation it has been discovered that the chief virtue and value of the hop resides in a yellow powder, which is found attached to the scales or leaves composing the catkins, and surrounding the seed which is found at the base of each of the said scales or leaves. This yellow powder is called lupulin, and when examined by the microscope, the yellow grains are found to be transparent, and of a glandular or sack-like structure. The valuable principles of this powder are two—a volatile oil, which gives to the hop its aroma, and constitutes two per cent. of its weight, and a bitter principle, which has been called lupulin, and which constitutes twelve to fifteen per cent. of the weight of the said lupulin. This last-mentioned principle is adjudged to be an alkaloid similar to quinin from Peruvian bark, or strichnia from the nux vomica.

The cause of the deterioration of the hop-strobiles is due, first, to the evaporization or etherealization of the volatile oil, which is taken from the scales by the air and dissipated; second, the oxidization of the alkaloid or bitter principle, from the continual contact of the oxygen of the air, so that the scales, after a time, become friable, are no longer soft and gummy to the touch, and are of a dead, dry yellow color.

Attempts have been made to secure the valuable parts of the hop in various ways: First, it has been proposed and tried to separate the volatile oil and bitter principle in the form of a tincture, but with only partial success, and no prospect of the practical adoption and use of the method. Again, it has been found that to keep the hops in a dark place has a tendency to preserve their virtues for a longer time, and this is practically adopted in England. Hops have also been closely packed in sacks or cases, so as to prevent a change of air in contact with them. It will be seen that in the last two methods, the oxygen present in the interstices of the hops and their packages has not been prevented from maintaining its corroding action upon the delicate scales and upon the membranous structures of the glands of the lupulin. This is a true oxidization—a vital decay on both sides of exceedingly delicate scales, and upon the infinitesimally thin walls of the glandular grains of lupulin. Upon these grains the oxygen acts, by gnawing away their delicate walls, and setting free from the opened cells the volatile aroma.

My method, which I will proceed to describe, that others skilled in such matters may apply and practise it, has for its object the deoxygenation of the air in contact with the hops. I remove the oxygen and leave the nitrogen; or, in other words, I preserve the hop in nitrogen. The nitrogen forms four-fifths of the atmosphere, and is entirely neutral and inert in its nature; therefore I leave the nitrogen, and supply the place of the extracted oxygen with more nitrogen from the atmosphere. If I should remove the oxygen and nitrogen together, that is, produce a vacuum to preserve the hop in, it will be seen that the volatile principle of the hop would, by its own expansive force, separate itself at once from its confinement in the cells of the glandular grains, and form an atmosphere of its own, which would be dissipated immediately on exposure. An illustration of this volatility *in vacuo* is given in the low temperature at which water boils on a high mountain, where the pressure of the air is diminished, and g so the instant evaporation of ether under the receiver of an air-pump.

To carry out my method, I line or encase a room or chamber, one or more of them, with thin iron plates, usually with what is called No. 20 iron, or I employ any air-tight compartment, case, or enclosure for the purpose. When I apply the plates, which are usually thirty-eight to forty-four inches wide, and nine or ten feet long, they are laid edge to edge on the bottom, top, and sides of the room, chamber, or case, leaving a minute separation of the edges to allow of expansion and contraction of the metal. Over the adjacent edges or separations between the plates are laid straps of the same metal, with strips of rubber beneath them. These straps are held firmly against the edges of the plates, so as to cause the rubber strips or packing to close the juncture perfectly air-tight, by means of flat-headed screws, with rubber washers under the heads. These screws pass through the straps, and usually between the edges of the plates into the wood behind or under them. If desired, the plates may be drilled or punched with holes at other points, and additional screws used to fasten them more strongly to the walls, floor, or ceiling of the compartment or chamber. A hatch-way is left in a convenient part of the chamber for the introduction of the hop-bales, and a short pipe is inserted into the chamber at two opposite points. The chamber is filled with bales of hops and the hatch-way secured. One of the short pipes is then connected, by means of a rubber hose, with a bellows or other air-propelling apparatus, by which the air in contact with the hops is caused to pass into a small chamber containing oxide of barytes, heated to a low redness, which then has the property of rapidly absorbing the oxygen, while the nitrogen is allowed to pass into a second small chamber containing water, or some other means of cooling it. From this second chamber it passes through a connection made with the other short pipe back again into the hop-chamber. This process is continued till the oxygen is quite exhausted from the hop-chamber. During the operation, at intervals, air is quickly let into the hop-chamber through a stop-cock, to supply the deficiency caused by the removal of oxygen. Of course this air itself has then to be deoxygenated, so that the process is a gradual reduction of the oxygen, till scarcely any is left, and the nitrogen alone remains in contact with the hops at an equilibrium of pressure with the air outside of the chamber.

I am aware that in preserving meats and vegetables it has been proposed to employ other gases to replace the air, with a view to get rid of the oxygen, but such processes have been employed essentially on the basis of a vacuum previously obtained, or by displacing water, brine, or other liquid in the cans, by means of the gas separately and previously prepared. It has also been proposed to introduce into cans containing meat, &c., gases, which, by electric or other agency, would unite with the oxygen and form other gases or liquids; and also, as well, by means of some simple or compound substance placed within the cases, or in prolonged communication therewith, whose gradual action would reduce, without additional aid, the oxygen by uniting with it. But I am not aware that it has ever been proposed, for the purpose intended, to eliminate by a single and rapid operation, as herein described, the obnoxious constituent of the enclosed air, in a large room or chamber, in the dry state, without the intervention of a liquid or the production of a vacuum. I know very well that the air of a preserving-chamber has been employed in a combustion-process, by which a very small portion of its oxygen has been converted into carbonic-acid gas; but this was not the production of nitrogen, but a mixture of carbonic acid and nitrogen; and when it is recalled that an animal will live where fire will not burn, it will be seen how very little indeed of the oxygen is converted into carbonic acid-gas by this means.

It is essential to the result contemplated in this specification, first, that no vacuum should be formed; second, that no liquids should come in contact with the hops to be preserved; third, that the operation being performed on the air of a large room should admit of no self-constituted and gradually oxidizable absorbents; fourth, that no deleterious or acid gases should be generated as the result of an ordinary combustion.

In fulfilling these conditions for the effectual preservation of the hop,

I claim, in connection with a suitably-enclosed chamber or compartment, nitrogen gas, when produced from the confined air by the agency of a chemical compound and heat, without the production of carbonic-acid gas, substantially as and for the purpose described.

S. FRANKLIN SCHOONMAKER. [L. S.]

Witnesses:
WM. H. WEED,
CHARLES RILEY.